(No Model.)
J. S. PRICE.
DEVICE FOR CHANGING SPEED.
No. 320,687. Patented June 23, 1885.
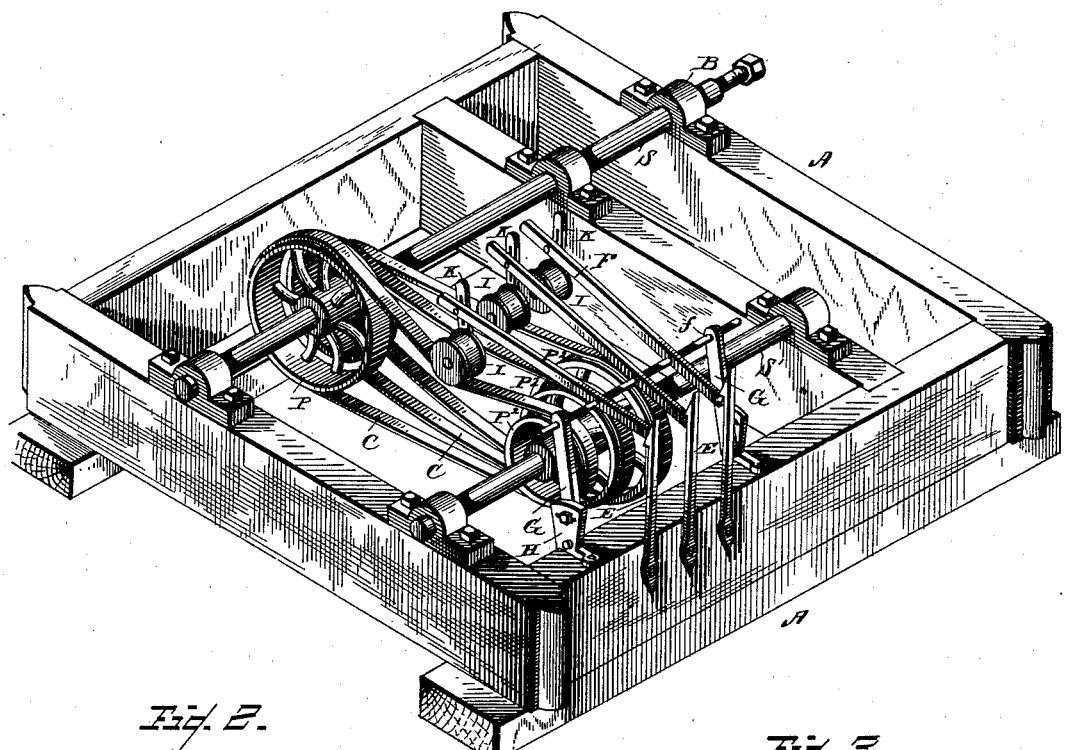
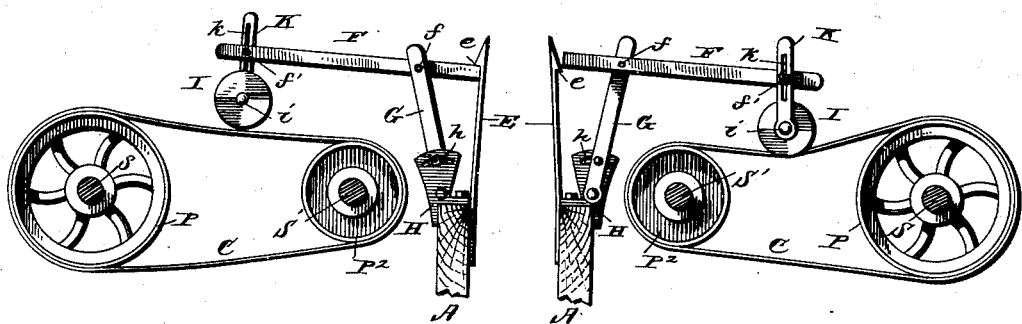
Witnesses
Inventor
Jacob S. Price
By his Attorney J. N. MacDonald

UNITED STATES PATENT OFFICE.

JACOB S. PRICE, OF MUTUAL, OHIO.

DEVICE FOR CHANGING SPEED.

SPECIFICATION forming part of Letters Patent No. 320,687, dated June 23, 1885.

Application filed May 13, 1885. (No model.)

*To all whom it may concern:*

Be it known that I, JACOB S. PRICE, a citizen of the United States, residing at Mutual, in the county of Champaign and State of Ohio, have invented certain new and useful Improvements in Devices for Changing Speed; and I do hereby declare the following to be a full, clear, and exact description of the invention, such as will enable others skilled in the art to which it appertains to make and use the same.

My invention relates to improvements in devices for increasing or decreasing the feed for saw-mills and other machinery analogous thereto; and it consists in a novel method of belt-tighteners, such as substantially shown in the accompanying drawings, in which—

Figure 1 is a perspective view of the device, and Figs. 2 and 3 detail sectional views of the belt-tightening device.

Referring more particularly to the drawings, the base or bed A supports the shaft-bearings B of the main shaft S. On this shaft A is mounted a band-pulley, P, and supplemental pulleys P'. Another or feed shaft S' carries the feed-pulleys P, having bands C running to their corresponding pulleys P' on the main shaft.

Secured to the front end of the bed A is a series of springs, E, each having a hooked end, $e$, which engages with the free ends of the handles F, whose opposite ends support idlers I. These handles F are perforated to receive a rod, $f$, which passes transversely through the handles and end bars G, and permits them to move pivotally thereon. The lower end of the bars G are secured in a curved slot, $h$, of a bracket, H, so that they can move backward or forward, as shown in the detail Figs. 2 and 3. The outer ends of said handles F have a pin, $f'$, passing through a slot, $k$, of upright, K, whose shaft $i$ supports the idlers I. The idlers I have thin flanges on each side to prevent the belts slipping. It is apparent that I may use as many belts as the capacity of the mill requires. Each idler I can be adjusted to proper bearing on the belt by adjusting the bar G in the bracket H or by moving the end of hands F up or down in the slot of upright K. I can easily and quickly bring any or all of the idlers into friction on the belts by simply detaching the spring-catches, as shown in Fig. 3, thereby permitting the idlers to fall upon the belts.

My device can be easily and economically attached to the ordinary forms of saw-mills, thereby greatly increasing their efficiency.

Having thus described my invention, what I claim as new, and desire to secure by Letters Patent, is—

1. The combination, with the main-shaft pulleys, of a series of feed-pulleys, each separate band for said pulleys being provided with an idler adjustably secured to a handle pivoted on an adjustable frame, substantially as and for the purpose set forth.

2. In a feed device for saw-mills, the combination, with the springs E, of the handles F, mounted upon an adjustable frame, and one or more idlers adjustably secured to said handles, substantially as and for the purpose set forth.

3. The combination, with the handles suitably held at their free ends, of the bars G, adjustably secured to slotted brackets H, whereby said bars can be moved forward or backward toward the belts, substantially as and for the purpose set forth.

In testimony whereof I affix my signature in the presence of three witnesses.

JACOB S. PRICE.

Witnesses:
W. HAMILTON,
JOHN M. PENCE,
COLIN McDONALD.